US011946832B2

(12) United States Patent
Posada

(10) Patent No.: US 11,946,832 B2
(45) Date of Patent: Apr. 2, 2024

(54) APPARATUS AND METHOD FOR SEEDING A WIND TUNNEL

(71) Applicant: Government of the United States, as represented by the Secretary of the Air Force, Wright-Patterson AFB, OH (US)

(72) Inventor: Natalia Posada, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/297,674

(22) Filed: Apr. 10, 2023

(65) Prior Publication Data

US 2023/0266197 A1 Aug. 24, 2023

Related U.S. Application Data

(63) Continuation of application No. 17/444,959, filed on Aug. 12, 2021, now abandoned.

(51) Int. Cl.
*G01M 9/04* (2006.01)
(52) U.S. Cl.
CPC ..................... *G01M 9/04* (2013.01)
(58) Field of Classification Search
None
See application file for complete search history.

(56) References Cited

U.S. PATENT DOCUMENTS

| 3,964,304 | A | * | 6/1976 | Parrish | G01M 9/04 73/147 |
|---|---|---|---|---|---|
| 4,326,119 | A | | 4/1982 | Swiatosz | |
| 4,493,211 | A | | 1/1985 | Weinstein | |
| 5,647,054 | A | | 7/1997 | Jones | |
| 8,960,596 | B2 | * | 2/2015 | Kremeyer | F02K 7/14 60/768 |
| 11,400,467 | B2 | * | 8/2022 | Manca | B05B 7/1686 |
| 2003/0202785 | A1 | | 10/2003 | Monitto | |
| 2015/0114410 | A1 | | 4/2015 | Doster | |
| 2016/0349147 | A1 | * | 12/2016 | Desantes Fernández | G01M 15/02 |
| 2017/0280772 | A1 | * | 10/2017 | Batista | A24F 40/46 |
| 2019/0041293 | A1 | * | 2/2019 | Brostmeyer | G01M 15/14 |

OTHER PUBLICATIONS

Advertisement for Polydisperse Six-Jet Atomizer 9306, believed to be available before priority filing date.
Advertisement for Rosco Mini-V Fog Machine, believed to be available before priority filing date.
Advertisement for TSI Monodisperse Generators, believed to be available before priority filing date.

* cited by examiner

*Primary Examiner* — Peter J Macchiarolo
*Assistant Examiner* — Jermaine L Jenkins
(74) *Attorney, Agent, or Firm* — AFMCLO/JAZ; Larry L. Huston

(57) ABSTRACT

A portable tracer fluid injection system. The system has a vapor cloud generator which vaporizes a vapor cloud generating liquid. The vapor cloud generator is uses a sub-ohm resistive heater to vaporize small volumes of the vapor cloud generating liquid, allowing for a relatively small tracer fluid injection system. This system has the benefit of being able to target specific regions of a test object within a wind tunnel and being usable for different positions within the test section of a wind tunnel.

20 Claims, 6 Drawing Sheets

APPARATUS AND METHOD FOR SEEDING A WIND TUNNEL

CROSS REFERENCE TO RELATED APPLICATION

This application is a continuation of U.S. patent application Ser. No. 17/444,959 filed Aug. 12, 2021, the disclosure of which is incorporated herein by reference.

STATEMENT OF GOVERNMENT INTEREST

The invention described and claimed herein may be manufactured and used by or for the Government of the United States of America for all government purposes without the payment of any royalty.

FIELD OF THE INVENTION

The present invention is directed to an apparatus for seeding a wind tunnel, and more particularly to a portable, low wattage, remotely controllable apparatus for seeding a wind tunnel.

BACKGROUND OF THE INVENTION

Wind tunnels have been used for several decades to study the effects of moving air on objects such as aircraft, missiles, automobiles and buildings. A typical wind tunnel has an air intake, a test section where the object under consideration, or a model thereof, is staged and an exhaust. The air may be recycled through the wind tunnel in a closed loop or may be replenished.

The air moves relative to the test object so that determinations and predictions can be made about the test object's lift and drag performance. For example, if the test object is a wing of an aircraft, measurements as to air speed, direction and pressure may be desired as the wing is exposed to the airflow at different angles. The test object may be studied in a static position under steady state air flow, dynamic conditions as the test object is moved through pitch, roll and yaw sequences, dynamic conditions as mass flow rate, air speed and air pressure are varied, as well as combinations of all of the foregoing.

Test data may be collected through particle image velocity (PIV) measurements, laser Doppler velocimetry, etc. But often analytical data are insufficient to complete the study. Data collection from the sensors may be too slow to capture critical data points and raw numbers may not provide a full picture of the test results.

Accordingly, wind tunnel fluid is often seeded with small particles, such as a vapor cloud, somewhat visually resembling smoke. The vapor cloud may be generated from propylene glycol (PG), vegetable glycol (VG), etc. The seeds provide a visual trace of the flow patterns around the test object. Vapor cloud seeding the fluid typically relies upon a wind tunnel seeder juxtaposed with the inlet of the wind tunnel. The vapor cloud generally fills and envelopes the test object and may even fill the entire test section of the wind tunnel.

Commercially available seed generators often operate at high pressures, up to 14 MPa, increasing both power requirements and safety concerns. But this arrangement is unsatisfactory if the wind tunnel seeder is too small for the test section of the wind tunnel and further unsatisfactory if one wishes to have more detailed study of only a limited, specific portion of the test object. Furthermore, large commercially available wind tunnel tracer fluid seeders can be difficult to adjust on the fly during a test and may require test personnel to make adjustments in the vicinity of the wind tunnel. The present invention seeks to overcome these problems with known tracer fluid seeders for wind tunnels.

BRIEF SUMMARY OF THE INVENTION

In one embodiment the invention comprises a tracer fluid injection system. The tracer fluid injection system has a sub-ohm resistive heated vapor cloud generator for generating vapor cloud when a vapor cloud generating liquid is disposed therein. The sub-ohm vapor cloud generator has an inlet for receiving air from an air source, whereby air entering the inlet may be entrained with a vapor cloud being generated by the sub-ohm vapor cloud generator; and further has an exhaust for controlled evacuation of vapor cloud from the sub-ohm vapor cloud generator to a test section of a wind tunnel.

In one particular embodiment the tracer fluid injection system may particularly comprise a vapor cloud generator for generating vapor cloud from a vapor cloud generating liquid. The vapor cloud generator comprises a chamber, the chamber has an air flow region and a reservoir in fluid communication therewith, the reservoir is in operable relationship with an electric powered sub-ohm heating coil for vaporizing a vapor cloud generating liquid containable within the reservoir into tracer fluid, a wick for transferring the liquid from the reservoir to the air flow region, the air flow region has an inlet for receiving air from an air source, whereby air entering the inlet can be entrained with a vapor cloud generated by the sub-ohm vapor cloud coil. The air flow region has an exhaust in fluid communication with the air flow region of the chamber and in fluid communication a test section of a wind tunnel for controlled evacuation of vapor cloud from the sub-ohm generator to a predetermined position of the test section.

DETAILED DESCRIPTION OF THE INVENTION

Figure 1:
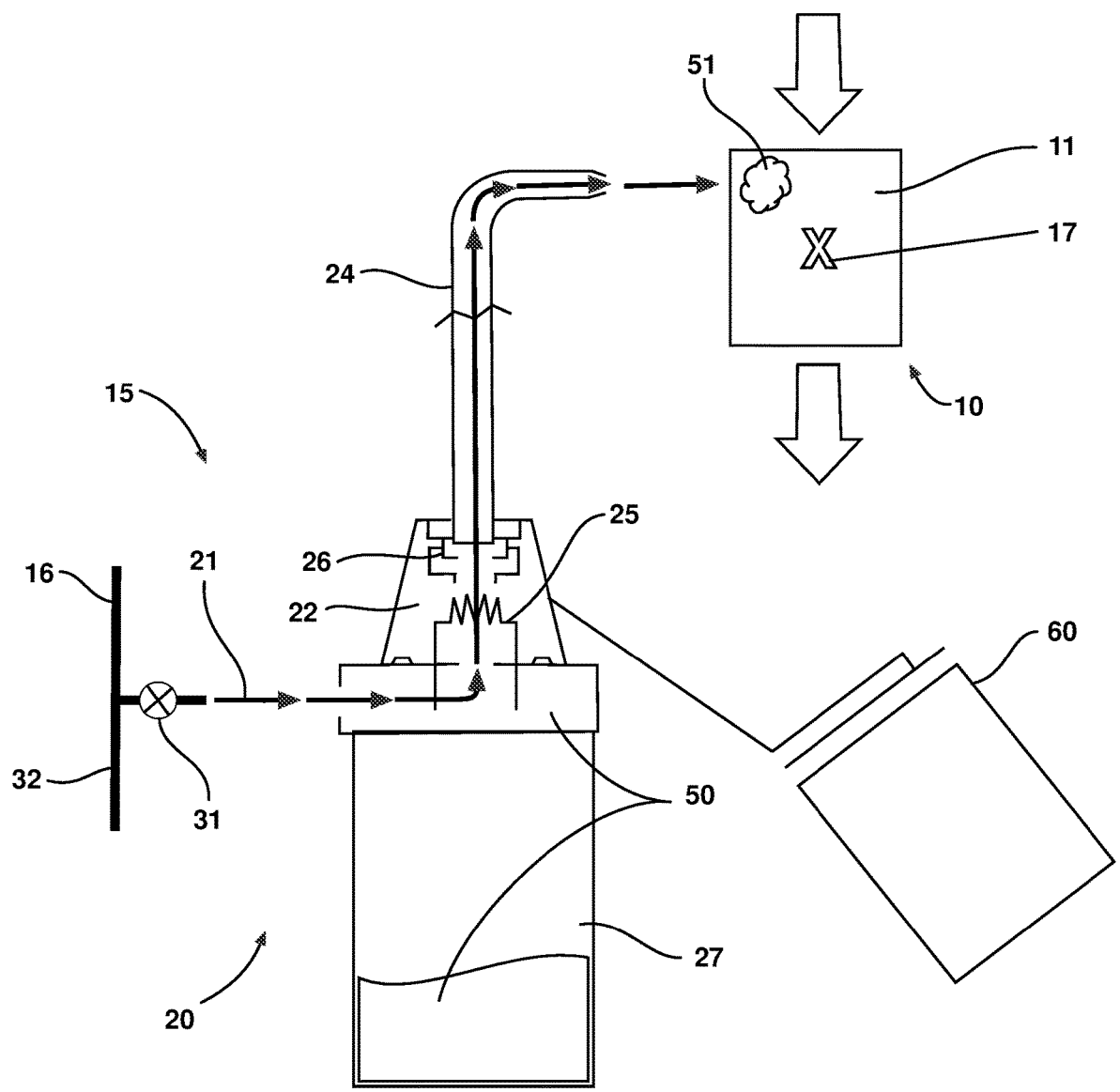
FIG. 1 is a schematic side elevational view of a first embodiment of a tracer fluid injection system according to the present invention, shown partially in cutaway, with the direction of air flow through the wind tunnel being generally indicated by the arrows.

Referring to FIG. 1, the invention comprises a tracer fluid injection system 15 for use with a wind tunnel 10. The system 15 comprises a vapor cloud generator 20 having an inlet 21 and an exhaust 24. The fluid flow path through the vapor cloud generator 20 comprises, in order, an air source 16, the inlet 21, an air transport region 22 within a chamber 23, the exhaust 24, and a test section 11 of a wind tunnel 10.

Examining the components in more detail, the air source 16 may comprise compressed air or simply be ambient, as further described below. If compressed air is selected, the air source 16 may be a tank of compressed air, a direct connection to an air compressor, a feed from a plant air line 32, or any suitable means for providing air at a pressure greater than ambient and which has sufficient differential pressure to propel the air from the source 16, through the chamber 23, to the wind tunnel 10 in appropriate quantities, velocities and pressures. Ambient air may be supplied through any intake to the inlet 21 of the chamber 23. Except as may be specifically claimed herein, the air source 16, wind tunnel 10 and test object 17 form no part of the present invention.

Figure 2:
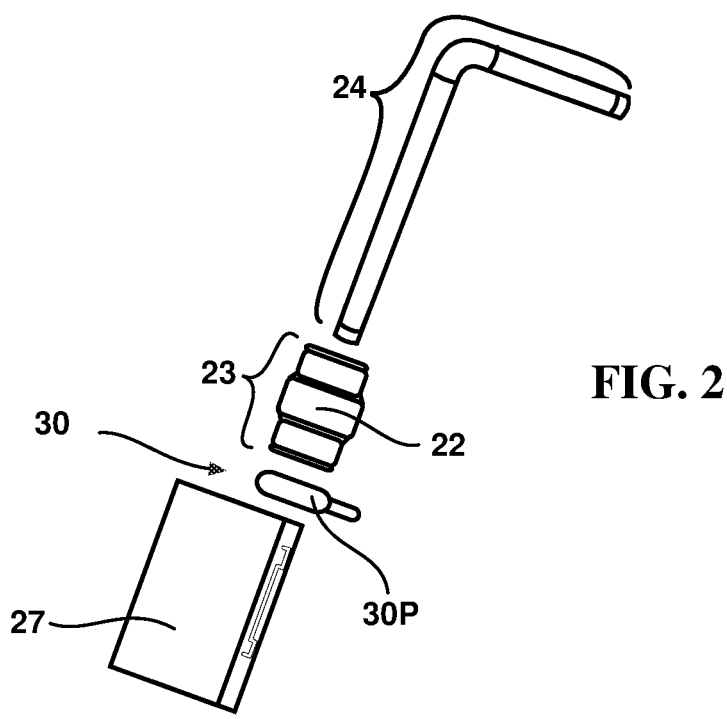
FIG. 2 is a scale exploded view of the vapor cloud generator of the tracer fluid injection system of FIG. 1.
Figure 2A:
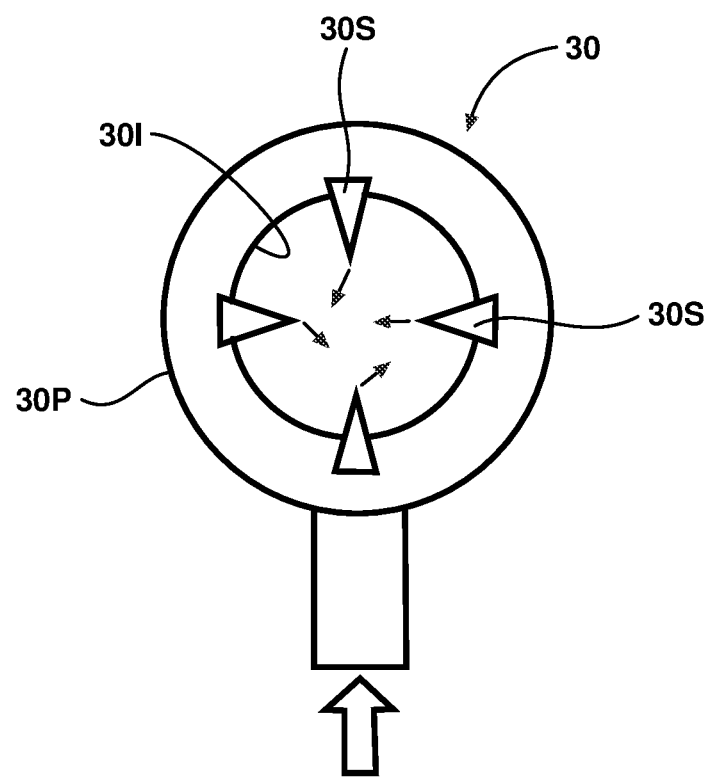
FIG. 2A is a schematic top plan view of the inlet ring shown in FIG. 2.

Referring to FIG. 2 and FIG. 2A and examining the invention in more detail, the vapor cloud seeding generator 20 comprises an inlet 21, a chamber 23 for receiving a vapor cloud generating liquid 50, a heating resistor for heating a vapor cloud generating liquid 50, a power source for energizing the heating resistor and an exhaust 24. The chamber 23, in turn, comprises a reservoir 27 for receiving and holding the vapor cloud generating liquid 50 and an air flow region in fluid communication with the reservoir 27, the inlet 21 and the exhaust 24. The chamber 23 of the vapor cloud generator 20 may be made of glass, stainless steel or any other suitable material which can contain the liquid 50 without leakage and accommodate the restive heating as discussed below.

The air from the air supply may be directed to and communicate with the inlet 21 as described above. The inlet 21 may feed the air into an annular ring 30 which circumscribes the chamber 23 of the vapor cloud generator 20. The annular ring 30 has an inner perimeter 30I and an outer perimeter 30P opposed thereto. The inner perimeter 30I of the annular ring 30 may have a plurality of circumferentially spaced ports 30S to equalize the air feed into the chamber 23 of the vapor cloud generator 20. In a preferred embodiment, the inner perimeter 30I of the annular ring 30 has a slot circumscribing the chamber 23, to provide generally balanced airflow throughout the entire air transport region 22 of the chamber 23.

A wick 26 may be provided to transport liquid 50 from the reservoir 27 to the air flow region 22. The wick 26 controls transport rate through pore volume density, cross section and surface energy. The wick 26 may be made of a nonwoven, woven material or simple aggregated fibers. The wick 26 material may be polyolefinic, Rayon, linen or preferably cotton. A wicking rate of about 0.1 mL/sec to about 1 mL/sec, and preferably about 0.3 mL/sec to about 0.6 m L/sec has been found suitable. The wick 26 may range from about 2 cm to about 6 cm and preferably about 3 cm to about 5 cm. The wetted portion of the wick 26 may expose about 2 mL to about 6 mL of the vapor cloud generating liquid 50 to the resistive heating element 25 at any point in time.

The transport of the vapor cloud generating liquid 50 from the reservoir 27 to the air flow region 22 exposes a small amount of the liquid 50 in the air flow region 22 which may be vaporized into the tracer fluid. By exposing only a relatively small quantity of the vapor cloud generating liquid 50 to the vaporization process at a given moment in time, the power for the heating requirement is reduced, and the tracer fluid injection system 15 can be made smaller and more portable. Alternatively and prophetically, the vapor cloud generating liquid 50 could feed the resistive heating element 25 by gravity feed if it was desired to dispose the reservoir 27 above the resistive heating element 25.

A resistive heating element 25 is juxtaposed with the wick 26. The restive heating element 25 produces heat in response to electricity supplied from a power source. The restive heating element 25 may be made of a wire which has high resistance to oxidation and good stability as to form, to minimize changes in shape or position throughout the life of the vapor cloud generator 20.

The resistive heating element 25 may comprise a wire having a diameter of about 1 mm to about 4 mm. This diameter provides a suitable combination of formability, stability and conversion of electric energy to heat energy. The wire should be suitable for temperatures at least about 1300° C. The wire may be made of a ferritic iron-chromium-aluminium alloy (FeCrAl). A suitable alloy is sold by the Sandvik Group under the name Kanthal® AF.

The resistive heating element 25 is juxtaposed with the wick 26, particularly the wetted portion thereof, to vaporize a desired quantity of vapor cloud generating liquid 50. This juxtaposition provides a relatively high surface area to be exposed to the wetted area of the wick 26. The resistive heating element 25 may be formed in a sinusoidal geometry, a series of parallel longitudinally oriented wires aligned with the wick 26, a coil internal to a hollow wick 26 or preferably a coil circumscribing the wick 26 in order to provide the necessary surface area to vaporize the vapor cloud generating liquid 50 in the wetted area of the wick 26.

The resistive heating element 25 may have a resistance of less than 2 ohms and preferably less than 1 ohm to minimize the power requirements. Particularly the resistive heating element 25 may have a resistance of about 0.2 ohms to about 0.5 ohms. In a particular embodiment, the resistive heating element 25 may be switched between two or more discrete resistance values to provide flexibility in the amount of tracer fluid generated by the vapor cloud generator 20. Resistance is measured throughout the entire length of the wire disposed within the vapor cloud generator 20. If desired, two or more resistive heating elements 25 may be used, provided the size and form factor are complementary with the wick 26, reservoir 27 and air flow region 22 of the vapor cloud generator 20.

The power supply may be provided from a DC battery or supplied by the AC mains. The power supply may range from at least about 5 W, 10 W, 15, W, 20 W or 25 W to not more than about 200 W, 150 W, 100 W, 75 W, 60 W or 30 W. In a particularly suitable low power embodiment, the power supply may range from about 8 W to about 16 W. A DC battery power supply may provide at least 1600 mAhrs and at least a 10 sec firing time to the resistive heating element 25. Table 1 below shows one possible and nonlimiting relationship between the available wattage and the resistance of the resistive heating element 25.

TABLE 1

| Embodiment | Resistance in Ohms | Power in Watts |
|---|---|---|
| 1 | 0.18 | 60-80 |
| 2 | 0.20 | 50-60 |
| 3 | 0.30 | 35-45 |

The vapor cloud generating liquid 50 comprises any suitable liquid 50 which can be volatilized in response to heat from the resistive heating element 25, does not unduly vaporize when the tracer fluid injection system 15 is not in use and provides a readily observable visible indicium of the air flow relative to a test object 17 disposed in a test section 11 of a wind tunnel 10 during testing. Suitable liquids 50 include water, polyethylene glycol, vegetable glycols, Di-Ethyl-Hexyl-Sebacat (DENS) and combinations thereof. If desired, the vapor cloud generating liquid 50 may be spiked with a dye to provide a color which contrasts with the color of the test object 17.

Referring back to FIG. 1, the vapor from the vapor cloud generating liquid 50 is removed from the vapor cloud generator 20, and particularly the flow transport region 22, to the exhaust 24. The exhaust 24 comprises the entire directed flow path from the outlet of the flow transport region 22 of the chamber 23 to the point where the vapor cloud 51 enters the test section 11 of the wind tunnel 10.

Additionally, the flow of tracer fluid from the vapor cloud generator 20 may be controlled by a microprocessor operably connected with the power supply of the vapor cloud generator 20. The controller 60 of the microprocessor may be operated by a laptop or similar device operated in a room remote from the wind tunnel 10. By removing the operator from the area near the wind tunnel 10, safety is elevated and the operator can concentrate on test parameters.

The controller 60 is in communication with a power supply so that the sub-ohm resistive heating element 25 can vaporize the vapor cloud generating liquid 50 in response to energy from the power supply. The controller 60 may be programmable or manually operated in response to test conditions to vary the amount of power, duration of power and pulse width of power supplied to the from the power supply to the sub-ohm resistive heating element 25.

One of skill will recognize the vapor cloud generator 20 portion of the fluid tracer system 15 is portable and can be used with various wind tunnels 10, as desired. For example, the vapor cloud generator 20, inlet 21 and exhaust 24 of the present invention may be used at a first position on a test section 11 of a wind tunnel 10 for a first test and at a second position, third position, etc. of the test section 11 for subsequent tests. Further flexibility occurs when the vapor cloud generator 20, inlet 21 and exhaust 24 may be used with a first wind tunnel 10 for a first test and even used with an entirely different wind tunnels 10 for subsequent tests.

Also the fluid tracer system 15 of the present invention provides for more focus of the tracer fluid in the test section 11, to specifically target a region of the test object 17 under study, without blanketing the entire test object 17 in tracer fluid and diluting or confounding the visual observations during testing.

The control the of the microprocessor may allow the operator to select start/stop times of air supply to the wind tunnel 10 intake, start stop times of air flow into the wind tunnel 10, air flow volume to the inlet 21, air flow volume to the wind tunnel 10 intake, test duration, power level to the restive heater, etc.

Figure 3:
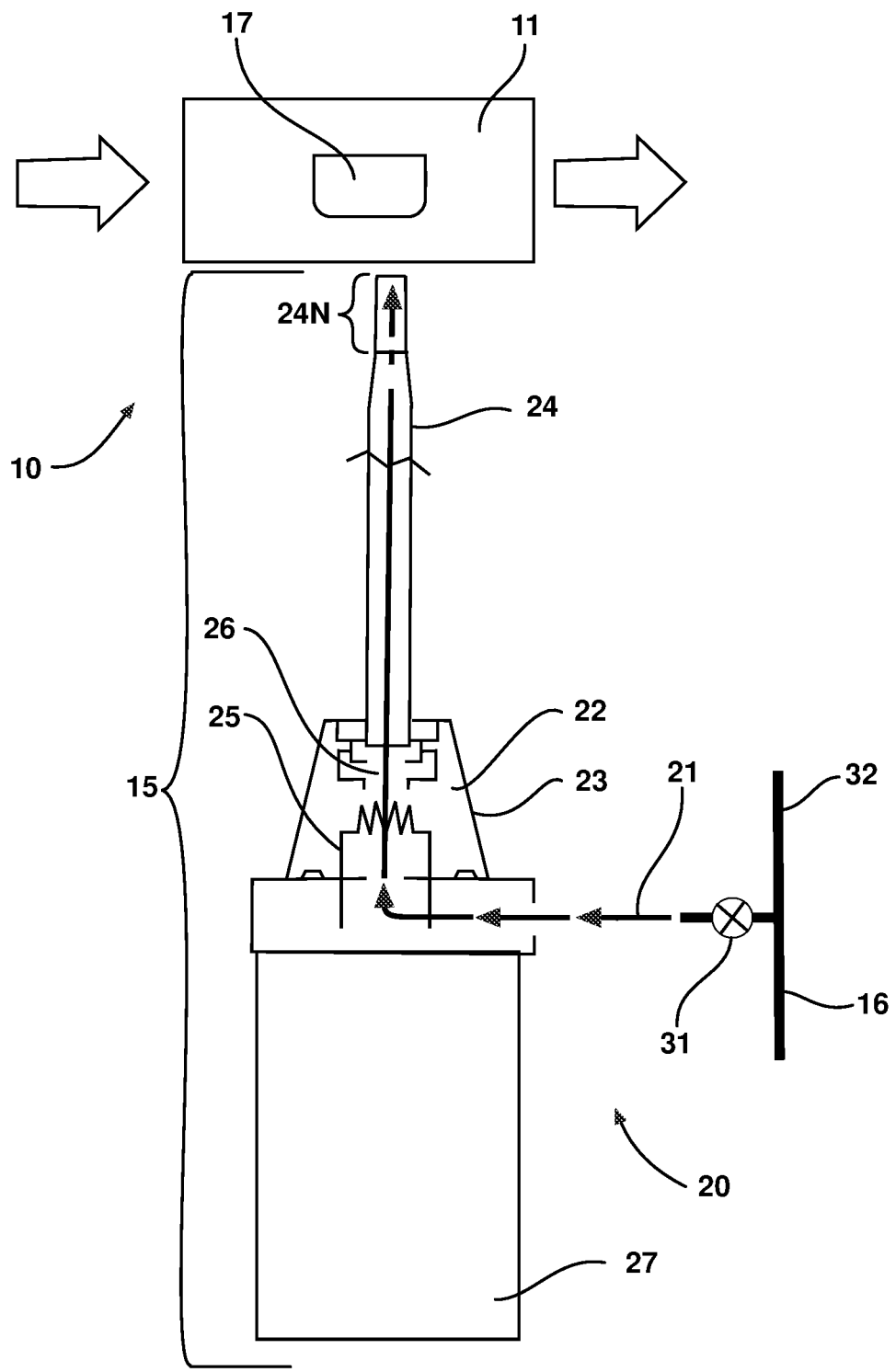
FIG. 3 is a schematic side elevation view of a variant embodiment of the tracer fluid injection system having a variable cross section exhaust with a nozzle.
Figure 4:
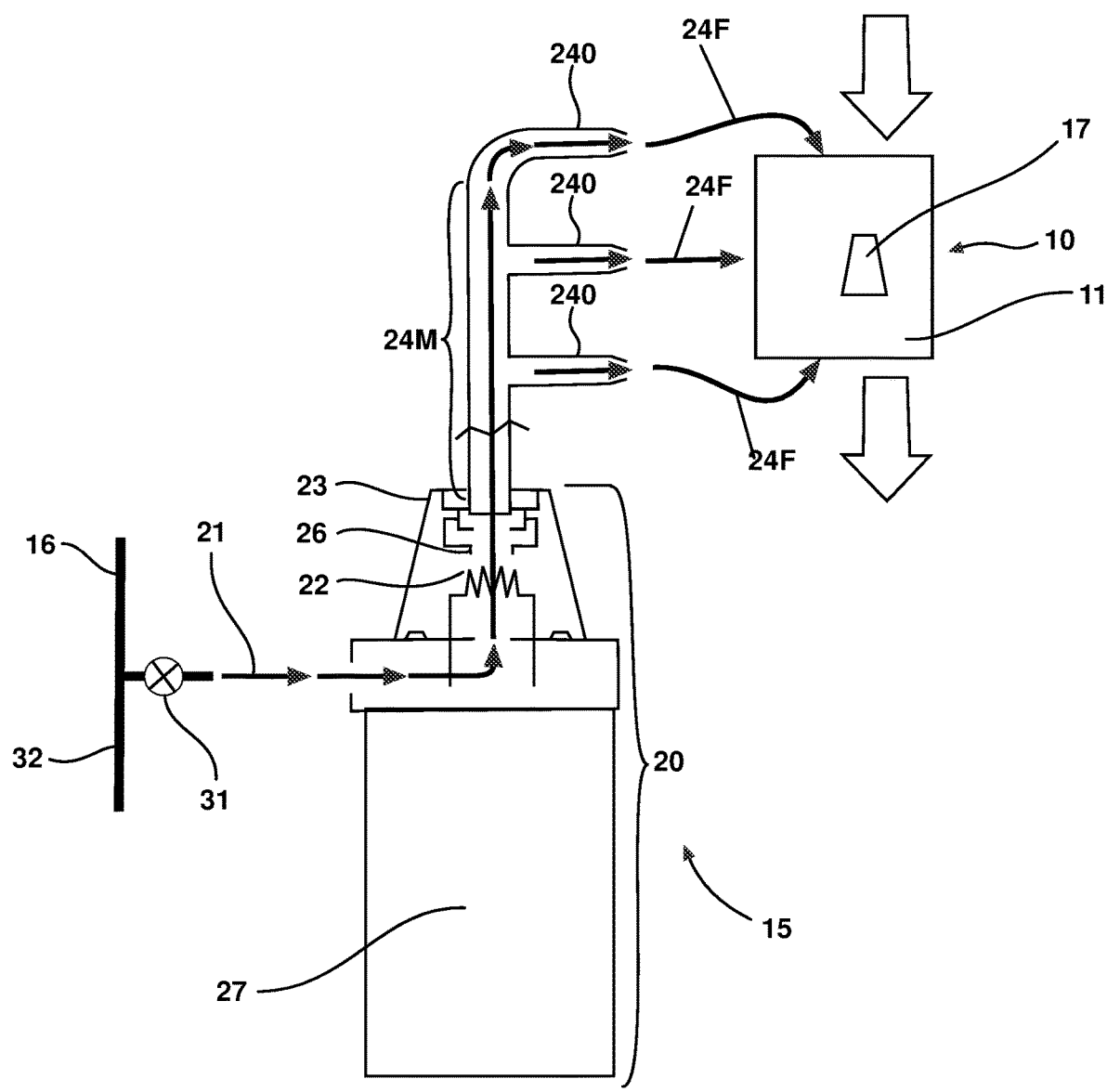
FIG. 4 is a schematic side elevational view of a variant embodiment of a tracer fluid injection system, having an exhaust with plural distributaries connected to the wind tunnel, the distributaries having optional flexible tubing.
Figure 5:
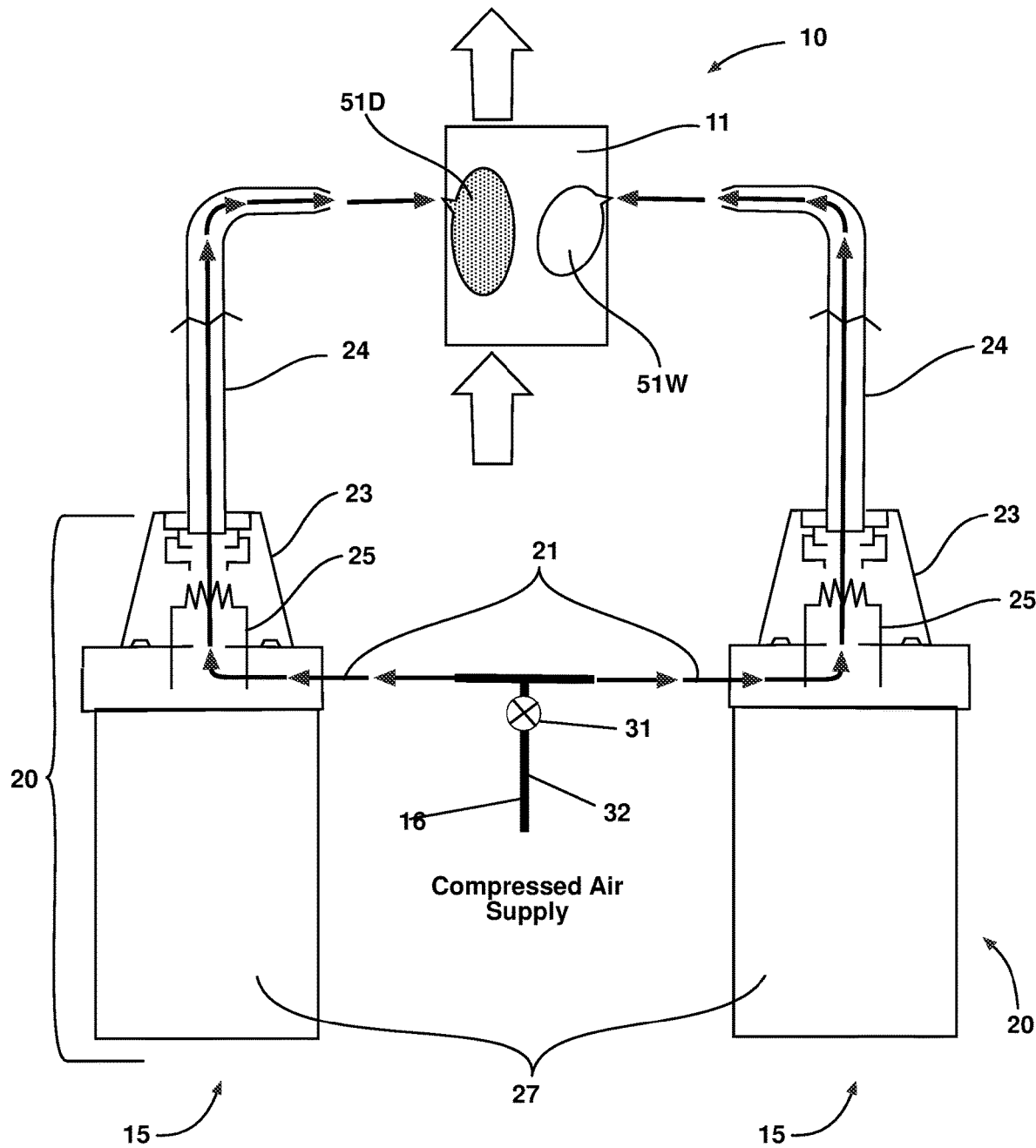
FIG. 5 is a schematic side elevational view of a variant embodiment of the invention having plural tracer fluid injection systems fed from a common air source, each tracer fluid injection system having an exhaust, the exhausts feeding mutually different locations of the test section.

Referring to FIG. 3, the exhaust 24 may comprise a variable cross section for reduced flow resistance until the distal end of the exhaust 24 is approached by the vapor cloud 51. The distal end of the exhaust 24 may comprise flexible tubing 24F, as discussed below. The exhaust 24 may have a cross sectional area of about 2 sq. mm to about 12 sq. mm, preferably about 3 sq. mm to about 9 sq. mm and more preferably about 5 sq. mm to about 8 sq. mm. If desired, the exhaust 24 may taper to a nozzle 24N for more precise placement within the test section 11 of the wind tunnel 10. The embodiment provides the benefit of decoupling low flow resistance between from vapor cloud generator 20 to the wind tunnel 10 and precise placement of the nozzle 24N at the test section 11.

Referring to FIG. 4, an alternative embodiment of the fluid tracer system 15 according to the present invention is shown. This embodiment has a plurality of effective exhausts 24 from the vapor cloud generator 20 to the test section 11, with three exhausts 24 being shown in a non-limiting embodiment. More particularly, this embodiment has an exhaust 24 with a single manifold 24M from the vapor cloud generator 20. A plurality of two, three, nor more distributaries 24D are joined to the manifold 24M at respective proximal ends and communicate the vapor cloud 51 therethrough to the test section 11. The distal ends of the distributaries 24D are joined to the test section 11 of the wind tunnel 10 so that the vapor cloud 51 can be communicated from the vapor cloud generator 20 to the test object 17.

The exhaust 24 may comprise flexible tubing 24F, for convenience, portability and ease of placing the vapor cloud generator 20 portion of the fluid tracer injection system 15 in various positions according to the test needs and the particular wind tunnel 10 being used. The flexible tubing 24F may preferably extend from the exhaust 24 of the chamber 23 to the test section 11 of the wind tunnel 10. The exhaust 24 may comprise TYGON® tubing 24F available from Tour Saint-Gobain.

This embodiment retains the portability, safety and flexibility benefits of the invention. This embodiment also has the benefit of providing a focused tracer fluid to two, three or more spaced apart positions of the test section 11 (which may be difficult to access with rigid tubing) and to particular positions of the test object 17.

Referring to FIG. 5, if desired, the test object 17 may be tested with plural and mutually different colors of tracer fluid. In this embodiment, plural vapor cloud generators 20 may be deployed in parallel, two being shown in a nonlimiting embodiment. Each of the plural vapor cloud generators 20 may be supplied from a common air source 16, such as a plant air line 32.

While a plurality of vapor cloud generators 20 each having a dedicated exhaust 24 is shown, the invention is not so limited. If desired, plural vapor cloud generators 20 may feed a single exhaust 24 to provide more flow volume than achievable with a single vapor cloud generator 20.

In this embodiment, as well as the other embodiments disclosed herein, a throttle valve 31 may be disposed between the air source 16 and the plurality of vapor cloud generators 20. The throttle valve 31 may be used to regulate the volume and pressure of the air flow into the vapor cloud generator 20. If plural vapor cloud generators 20 are deployed, this arrangement provides for each of the vapor cloud generators 20 to have the same flow characteristics or mutually different flow characteristics. This embodiment provides the benefit of allowing for specific tailoring of the test to the particular test object 17 and experiment under consideration.

By way of nonlimiting example, first vapor cloud generator 20 may have the vapor cloud generating liquid 50 spiked with dye to urge the vapor cloud 51 towards a bright white color 51W, while a second vapor cloud generator 20 may have the vapor cloud generating liquid 50 spiked with dye to urge the vapor cloud 51 towards a bright dark grey color 51G. This arrangement provides the benefit that for a test object 17 having a complex geometry, the differently colored vapor cloud 51 streams can be easily visually discerned and test results more precisely understood.

Figure 6B:
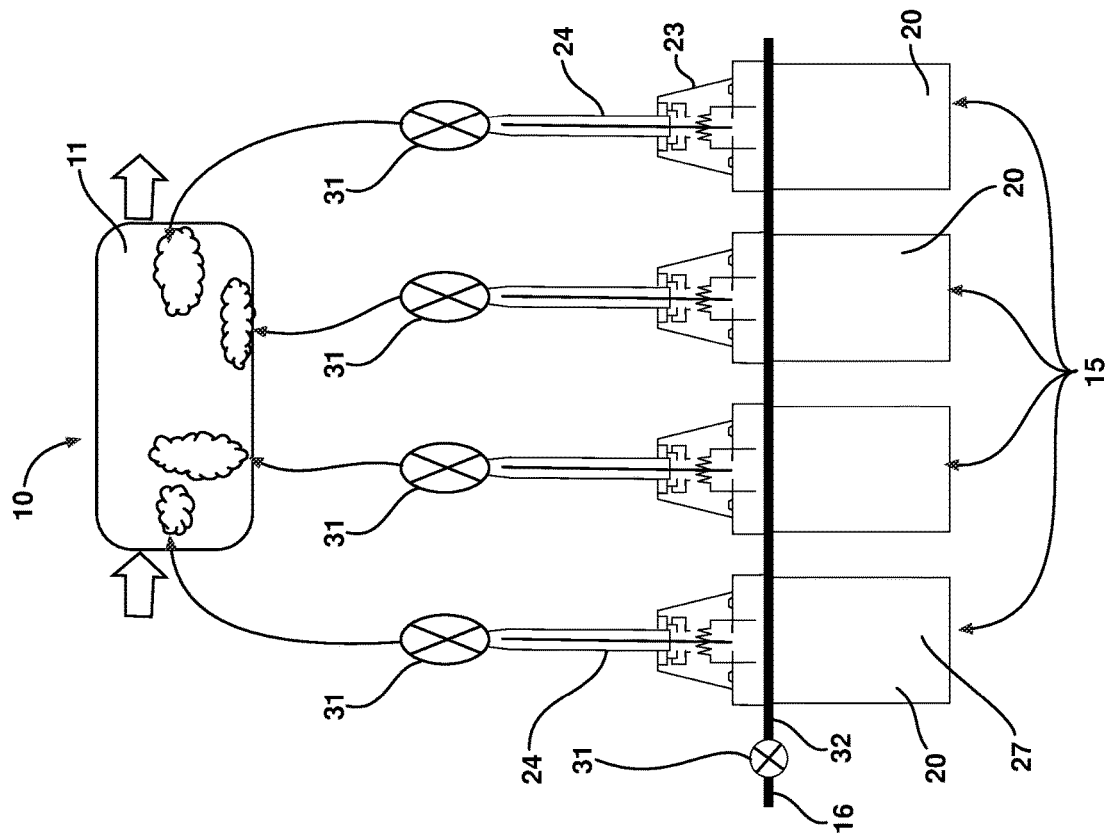
FIG. 6B is a schematic side elevational view of a variant embodiment of the invention having plural tracer fluid systems fed from a common air source, each tracer fluid injection system having an exhaust, the exhausts feeding mutually different locations of the test section.
Figure 6A:
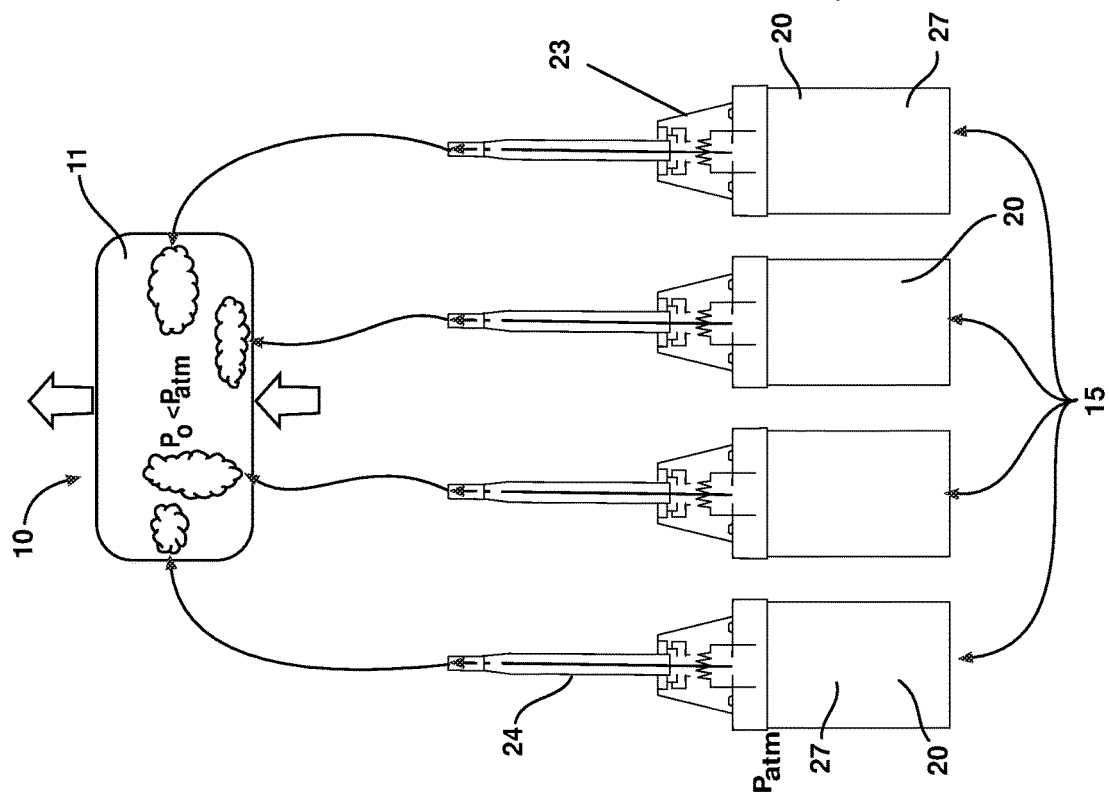
FIG. 6A is a schematic side elevational view of a variant embodiment of the invention having a wind tunnel with a subatmospheric test section and plural tracer fluid systems with exhausts feeding mutually different location of the test section.

Referring to FIG. 6A, if desired, the vapor cloud 51 may be drawn into the test section 11 of the wind tunnel 10 by a vacuum created due to the Bernoulli flow of the air in the wind tunnel 10. This arrangement eliminates the need for a positive pressure air source 16 at the inlet 21, conserving energy and providing a safer work environment. In such an embodiment, one or more vapor cloud generators 20 may supply a seeded vapor cloud 51 to the test section 11 of the wind tunnel 10 with four vapor cloud generators 20 being shown in a nonlimiting illustration.

In such an embodiment, the vapor cloud generators 20 need not have air supplied from a separate air source 16. Instead, the test section 11 of the wind tunnel 10 may be at a vacuum. That is, the test section 11 may have a pressure $p_0$ which is less than atmospheric pressure $p_{atm}$. In such an embodiment the Bernoulli effect of the wind tunnel 10 draws the vapor cloud 51 from the vapor cloud generator 20, through the exhaust 24 and into the test section 11. This embodiment provides the benefit that transport of the vapor cloud 51 occurs by operation of the wind tunnel 10 and does not require a dedicated air source 16.

Referring to FIG. 6B, plural vapor generators 20 may provide unequal flows of the vapor cloud 51 to the test section 11 of the wind tunnel 10. For example, vapor generator 20 #1 may have an equal or greater flow rate than vapor generator 20 #2, which in turn has an equal or greater flow rate than vapor generator 20 #3 which in turn has an equal or greater flow rate than vapor generator 20 #4, etc. Flow rate may be controlled by a dedicated throttle valve 31 in each exhaust 24 or by the output capacity of each vapor generator 20. Likewise two or more vapor generators 20 of this embodiment may have mutually different colors of vapor clouds 51. This embodiment provides the benefit of flexibility in decoupling volume and visual appearance of vapor clouds 51 for complex wind tunnel 10 tests.

The invention is not limited by the specific description above. It is to be understood the disclosed ranges are approximate and any upper limit of a range may be paired with any lower limit of that same parameter. One of skill will understand various combinations and permutations of the above embodiments are feasible and only limited by the scope of the appended claims.

What is claimed is:

1. A tracer fluid injection system comprising: a sub-ohm resistive heated vapor cloud generator for generating vapor cloud when a vapor cloud generating liquid is disposed therein, the sub-ohm resistive heated vapor cloud generator having an inlet for receiving air from an air source, whereby air entering the inlet is entrained with the vapor cloud being generated by the sub-ohm resistive heated vapor cloud generator; and having an exhaust for controlled evacuation of the vapor cloud from the sub-ohm resistive heated vapor cloud generator to a test section of a wind tunnel.

2. A tracer fluid injection system according to claim 1 wherein the sub-ohm resistive heated vapor cloud generator has a chamber for generating vapor cloud therein and subsequent evacuation through the exhaust, the chamber having a volume of 1 mL to 10 mL.

3. A tracer fluid injection system according to claim 2 wherein the chamber has a volume of 2 mL to 6 mL.

4. A tracer fluid injection system according to claim 3 wherein the chamber has a generally cylindrical shape defining a longitudinal axis, the chamber being in fluid communication with the inlet and the exhaust, the inlet and the exhaust being generally diametrically opposed relative to the longitudinal axis.

5. A tracer fluid injection system according to claim 1 wherein the exhaust has a flow area of 30 to 130 square millimeters.

6. A tracer fluid injection system according to claim 1, wherein the exhaust comprises flexible tubing, the flexible tubing having a length between the chamber and the test section of 1 meter to 4 meters.

7. A tracer fluid injection system for seeding a wind tunnel, the system comprising:
a vapor cloud generator for generating a vapor cloud from a vapor cloud generating liquid, the vapor cloud generator comprising a chamber, the chamber having an air flow region and a reservoir in fluid communication therewith, the reservoir being in operable relationship with an electrically powered sub-ohm heating coil for vaporizing the vapor cloud generating liquid, containable within the reservoir, into a tracer fluid, a wick for transferring the liquid from the reservoir to the air flow region, the air flow region having an inlet for receiving air from an air source, whereby air entering the inlet is entrained with the vapor cloud generated by the sub-ohm heating coil, the air flow region having an exhaust in fluid communication with the air flow region of the chamber and in fluid communication a test section of a wind tunnel for controlled evacuation of the vapor cloud from the sub ohm vapor cloud generator to a predetermined position of the test section.

8. A tracer fluid injection system according to claim 7 wherein the vapor cloud generator is disposed within a housing, and the sub-ohm heating coil is powered by a battery, the battery and the vapor cloud generator being disposed in the same housing.

9. A tracer fluid injection system according to claim 7 wherein the inlet comprises an annular ring having an inner perimeter and an outer perimeter opposed thereto, the inner perimeter having an opening circumscribing the vapor cloud generator for injecting air from the annular ring into the air flow region of the chamber.

10. A tracer fluid injection system according to claim 7 further comprising a controller in communication with a power supply, the sub-ohm heating coil heating the vapor cloud generating liquid in response to energy from the power supply, the controller being programmable to vary the amount of power, duration of power and pulse width of power supplied to the from the power supply to the sub-ohm heating coil.

11. A tracer fluid injection system according to claim 10 comprising a first vapor cloud generator for generating a first vapor cloud and further comprising a second vapor cloud generator for generating a second vapor cloud when a second vapor cloud generating liquid is disposed therein, the second vapor cloud generator having an the inlet for receiving air from an air source, whereby air entering the inlet is entrained with vapor cloud being generated by the second vapor cloud generator; and having an exhaust for controlled evacuation of the second vapor cloud from the second vapor cloud generator to the test section of the wind tunnel.

12. A tracer fluid injection system according to claim 11 wherein the first vapor cloud generator and the second vapor cloud generator are charged with first and second respective liquids, the first and second respective liquids generating mutually different colors of vapor clouds during operation.

13. A tracer fluid injection system according to claim 12 wherein a first vapor cloud exhaust and a second vapor cloud exhaust are directed to mutually different positions of the test section.

14. A tracer fluid injection system according to claim 13 wherein the first vapor cloud generator and the second vapor cloud generator have mutually mass flow rates during operation and are directed to mutually different positions of a test object disposed within the test section.

15. A tracer fluid injection system according to claim 11 wherein during operation the air source is at a pressure greater than the pressure of the chamber.

16. A tracer fluid injection system according to claim 11 wherein the air source is at ambient pressure the wind tunnel configured to be at a pressure less than atmospheric during operation, whereby air is drawn from the ambient air source to the inlet of the chamber, through the air flow region of the chamber to the exhaust and to the wind tunnel.

17. A tracer fluid injection system according to claim 7 wherein the controller is remotely disposed from the test section of the wind tunnel, whereby an operator can operate the controller and not be in the same room as the wind tunnel during operation.

18. A tracer fluid injection system according to claim 17 wherein the controller further has the capability to modulate air flow from the air source to the inlet with respect to at least one of air pressure, air mass flow rate or air speed.

19. A method of testing a test object in a wind tunnel, the method comprising:
    providing an air source in fluid communication with an inlet of a vapor cloud generator having a chamber, the chamber having a sub-ohm resistive heating element to vaporize fluid from a reservoir;
    delivering air from the air source to the inlet of the vapor cloud chamber;
    applying less than 200 W of power to the resistor whereby the sub-ohm resistive heating element vaporizes a vapor cloud generating liquid disposed in a reservoir into a vapor cloud, the reservoir being in fluid communication with the inlet and in fluid communication with an exhaust; evacuating the vapor cloud from the chamber to the exhaust;
    directing the vapor cloud through the exhaust to an operating wind tunnel; the operating wind tunnel having a test section with a test object therein, the test object being exposed to wind in the test section; and
    injecting the vapor cloud from the exhaust to a predetermined position juxtaposed with the test section.

20. A method according to claim 19 wherein the step of applying power to the sub-ohm resistive heating element applies less than 60 W of power.

* * * * *